G. AGRILLO.
BOTTLE FILLER.
APPLICATION FILED JUNE 16, 1920.
1,352,165. Patented Sept. 7, 1920.
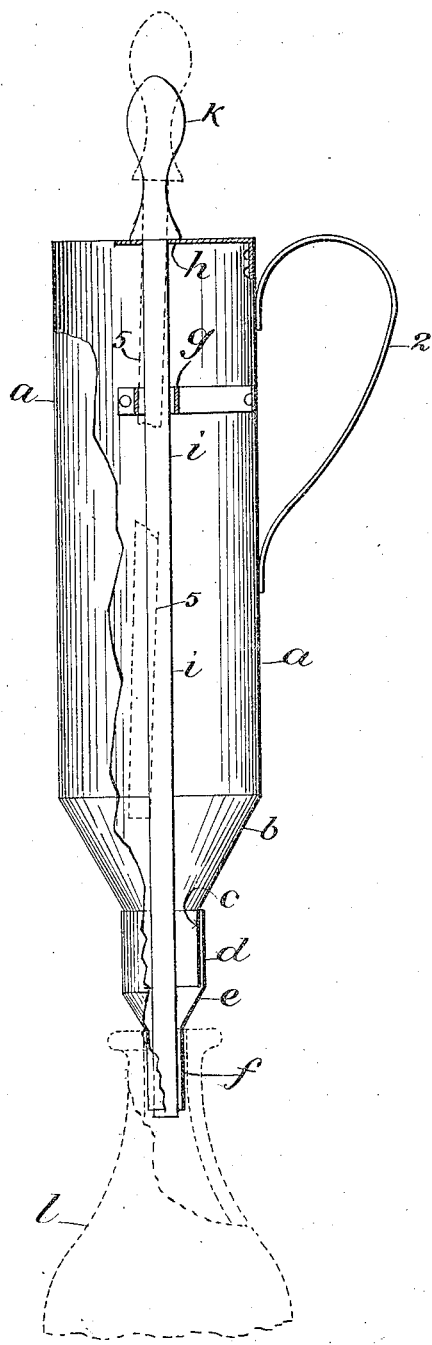
INVENTOR
Giuseppe Agrillo
BY J. H. Murdle
ATTORNEY

UNITED STATES PATENT OFFICE.

GIUSEPPE AGRILLO, OF BROOKLYN, NEW YORK.

BOTTLE-FILLER.

1,352,165.  Specification of Letters Patent.  Patented Sept. 7, 1920.

Application filed June 16, 1920. Serial No. 389,381.

*To all whom it may concern:*

Be it known that I, GIUSEPPE AGRILLO, citizen of the United States, and resident of the city of Brooklyn, in the county of Kings and State of New York, have invented certain new and useful Improvements in Bottle-Fillers, of which the following is a specification.

The invention relates to a portable device for reducing vegetables and fruits to a pulpy condition, and at the same time to be operated manually when discharging the pulp into jugs, bottles and other small necked vessels, all of which will be fully and clearly described hereinafter.

The object of the invention is to provide means whereby materials, such as raw tomatoes, may be made into pulp and at the same time be forced into a jug or narrow mouthed vessel in a manner to prevent the pulp coming in contact with the hands of the operator while operating the device.

The invention consists of a cylindrical shaped vessel, which terminates at its lower portion into a conical or funnel shape, the latter provided with the depending cylindrical shaped nozzle, adapted to receive a correspondingly shaped removable cylindrical cap, a portion of which is conical in shape and terminates into an elongated nozzle. The interior of the cylindrical shaped vessel is provided with a guide near its upper end and a guide on its extreme end. The guides above referred to are adapted to receive a vertically arranged plunger rod, manually operated.

In the drawing, the figure represents a longitudinal, vertical section of the device which fully illustrates its construction and mode of operation.

Similar letters refer to similar parts throughout the drawing, in which $a$ represents the cylindrical vessel provided with the handle 2. Said vessel is provided at its lower portion with a conical or funnel shape $b$ and the depending nozzle $c$, the latter of which is adapted to receive a correspondingly shaped removable cap $d$ provided with the conical or funnel shaped body $e$ and the depending cylindrical nozzle $f$. The removable cap $d$ may be removed and cap having a different sized depending nozzle substituted therefor; this change, however, will depend upon the consistency of the pulp. The interior of the vessel $a$ is provided with the plunger rod guide $g$ while the top of the aforesaid cylindrical vessel $a$ is provided with the guide $h$ said guides adapted to receive the plunger rod $i$, which is provided with the handle $k$. The plunger rod guide $h$ located at the upper end of the cylindrical vessel $a$ is adapted to guide the plunger rod $i$ vertically or laterally, the guide $g$ limits the throw or swing of said plunger rod $i$ when operated.

Mode of operation.

After the fruit or vegetable shall have been cut, chopped or cut apart, it is then placed within the cylindrical vessel $a$, the operator supporting the device by its handle 2 with one hand while he operates with the other hand the plunger rod $i$ in a vertical movement when forcing the pulp into the neck of the bottle 1. When stirring the chopped or pulped contents, the plunger as shown in dotted lines 5 may be lifted and swung around upwardly and downwardly in an angular direction to the vertical center of the vessel $a$ thereby stirring up and loosening up the pulp, after which the plunger rod is operated vertically, thus forcing the pulp into the bottle 1 aforesaid, thereby completing the operation which may be repeated until the contents of the vessel $a$ shall have been removed by the series of operations. It will be obvious that by having opening in the guide $g$ somewhat larger in diameter than that of the guide $h$, this arrangement enables the plunger rod $i$ to be swung away from a vertical position to that of an angular one.

Having thus described my invention, what I claim as new and desire to secure by Letters Patent, is—

In a pulp producer and bottle filler, the combination consisting of a cylindrical vessel provided with a funnel shaped portion and nozzle integral therewith, a removable cap provided with a conical shape and depending nozzle, a plunger rod guide with enlarged opening arranged within the cylindrical vessel aforesaid near its upper end, a plunger rod guide arranged on the top of the cylindrical vessel aforesaid, and a manually operated plunger rod substantially as described.

Signed at the city of Brooklyn in the county of Kings and State of New York.

GIUSEPPE AGRILLO.